United States Patent
Jain et al.

(10) Patent No.: US 8,228,923 B1
(45) Date of Patent: Jul. 24, 2012

(54) METHOD AND APPARATUS FOR MEASURING SYSTEM LATENCY USING GLOBAL TIME STAMP

(75) Inventors: Naveen K. Jain, San Jose, CA (US); Venkata Rangavajjhala, Fremont, CA (US)

(73) Assignee: Tellabs Operations, Inc., Naperville, IL (US)

( * ) Notice: Subject to any disclaimer, the term of this patent is extended or adjusted under 35 U.S.C. 154(b) by 291 days.

(21) Appl. No.: 11/971,427

(22) Filed: Jan. 9, 2008

(51) Int. Cl.
*H04L 12/28* (2006.01)
*H04L 12/56* (2006.01)
*H04J 3/06* (2006.01)
*H04J 3/00* (2006.01)

(52) U.S. Cl. .......... 370/395.62; 370/350; 370/503; 370/509; 370/510; 370/511; 370/512

(58) Field of Classification Search .......... 370/368, 370/395.62, 516, 304, 324, 350, 503, 509, 370/510, 511, 512, 513, 514, 520; 375/226, 375/371; 702/69; 714/12, 500, 503, 731, 714/395.62
See application file for complete search history.

(56) References Cited

U.S. PATENT DOCUMENTS

| | | | |
|---|---|---|---|
| 6,532,274 B1 * | 3/2003 | Ruffini | 375/356 |
| 6,868,069 B2 * | 3/2005 | Knobbe et al. | 370/252 |
| 2005/0123003 A1 * | 6/2005 | Bordonaro et al. | 370/516 |
| 2005/0157705 A1 * | 7/2005 | Galetto et al. | 370/352 |

* cited by examiner

*Primary Examiner* — Steven H Nguyen
*Assistant Examiner* — Adam Duda
(74) *Attorney, Agent, or Firm* — JW Law Group; James M. Wu

(57) ABSTRACT

A network device having a system performance measurement unit employing one or more global time stamps for measuring the device performance is disclosed. The device includes an ingress circuit, a global time counter, an egress circuit, and a processor. The ingress circuit is configured to receive a packet from an input port while the global time counter generates an arrival time stamp in accordance with the arrival time of the packet. The egress circuit is capable of forwarding the packet to other network devices via an output port. The processor, in one embodiment, is configured to calculate packet latency in response to the arrival time stamp.

20 Claims, 4 Drawing Sheets

METHOD AND APPARATUS FOR MEASURING SYSTEM LATENCY USING GLOBAL TIME STAMP

FIELD

The exemplary embodiment(s) of the present invention relates to network performance. More specifically, the embodiment(s) of the present invention relates to measuring system latency and jitter of a communications network.

BACKGROUND

In order to support more information in the form of video, audio, data, and telephony at higher rates, high performance systems are required. Data products, for instance, are increasingly being used to carry traffic that is delay-sensitive. For example, to play a video or to start a real-time voice conversation, it is critical to manage and control packet latency as well as jitter in order to have video and/or voice packets delivered properly. High performance systems often mean low system (or packet) latency and/or jitter. Latency typically indicates a delay for a packet to travel through a system and jitter means the change in latency from packet to packet.

Although networks are typically designed to absorb some jitters by data buffering as well as jitter compensating algorithms, excessive jitters and latencies can cause buffer to overflow and underflows. System (or packet) latency and/or jitter are typically important information to assess and identify the real performance of a network. It should be noted that while too much latency can often render interactive applications such as voice and video unusable, too much jitter renders the service unusable. A problem associated with system latency and jitter is that they are difficult to measure and detect.

A conventional approach of measuring and/or monitoring latency and jitter is to use a third party (or vendor) test equipment. The third party test equipment is typically attached to the input port(s) and output ports of a network system such as a router to detect and record delays for each packet traveling through the network system. From recorded delays, the third party test equipment can provide latency and jitter associated with each packet or packets.

Using third party test equipment, however, is often difficult to measure real-time delays (in turn measuring latency and jitter) in the filed. Measuring latency and/or jitter using third party test equipment is commonly carried out in a controlled laboratory environment.

SUMMARY

A network device such as a network router includes a performance measurement unit for monitoring system latency and jitter using time stamps. The device includes an ingress circuit, a global time counter, an egress circuit, and a processor. The ingress circuit is capable of receiving a packet from an input port while the global time counter is capable of generating an arrival time stamp in accordance with the arrival time of the packet. The ingress circuit then stamp the arrival time on the packet. The egress circuit subsequently retrieves the arrival time stamp from the packet and forwards the packet to other network devices via an output port. The egress circuit is also capable to get the present value of global time counter. The processor, in one embodiment, is configured to calculate system latency and jitter in response to the arrival time stamp of the packet and present global time counter value (departure time stamp). It should be noted that ingress circuit and global time counter can be fabricated on the same chip.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
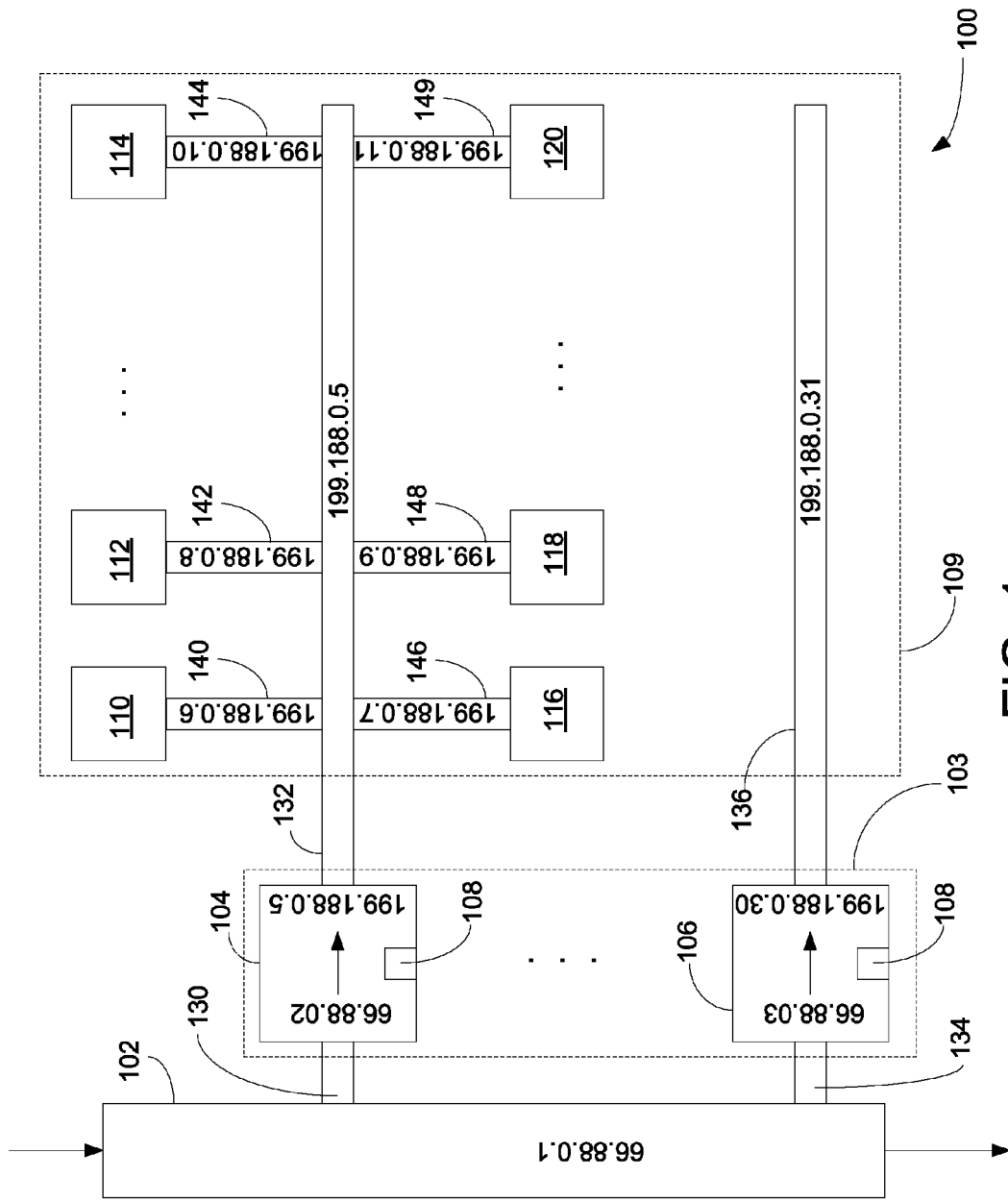
FIG. 1 is a block diagram illustrating network routing devices having system performance measurement units using time stamps in accordance with one embodiment of the present invention.

Embodiment(s) of the present invention is described herein in the context of a method, device, and apparatus of measuring and monitoring real-time system latency and jitters using global time stamps.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skilled in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A network router or switch includes a performance measurement unit for monitoring system latency and jitter using global time stamps. The router includes an ingress circuit, a global time counter, an egress circuit, and a processor. The ingress circuit is capable of receiving a packet from an input port while the global time counter is capable of generating an arrival time stamp in accordance with the arrival time of the packet. The egress circuit subsequently retrieves the arrival time stamp and present global time counter value (departure time stamp). The egress circuit then forwards the packet to other network devices via an output port. The processor, in one embodiment, is configured to calculate system latency and jitter in response to the arrival time stamp and the departure time stamp of the packet. It should be noted that ingress circuit and global time counter can be placed on the same chip.

FIG. 1 is a block diagram 100 illustrating network routing devices having system performance measurement units using arrival time stamps in accordance with one embodiment of the present invention. Diagram 100 includes a communications network 102, a set of network routers 103, and down stream hosts 109. Down stream hosts 109, for instance, can be any types of network capable devices, such as optical converters, routers, switches, servers, printers, computers, and/or a combination of routers, servers, and computers. It should be noted that the underlying concept of the exemplary embodiment(s) of the present invention would not change if one or more blocks (circuit or circuitries) were added to or removed from diagram 100.

Network routers 103 include multiple routers, switches, and/or packet processing devices 104-106. Each device 104 or 106 includes a system performance measurement unit 108, which, for example, is used to measure or monitor real-time system latency and/or jitter. System latency, in one embodiment, is a delay of time for a packet to travel through the router. In other words, latency can be viewed as a time period for a router to route a packet. It should be noted that similar packets should have similar or substantially similar latencies. System jitter, on the other hand, may be defined as a change in latency from packet to packet. It should be noted that the information relating to latency and jitter is required for various certification processes for industries as well as governmental standards.

A function of a network router is to receive a packet from a source and redirect the received packet to a destination via an achievable and/or efficient path or output port. While a router may use one Internet Protocol ("IP") address at its input ports, it may use a different IP address at its output ports. As shown in FIG. 1, the IP address, for example, for the input ports of device 104 is 66.88.02, and the IP address for the output ports of device 104 is 199.188.0.5. As such, each packet needs to be processed so that it can be classified and scheduled before it can be routed. Router, in one embodiment, is also capable of communicating with other routers. For example, routing device 104 may be configured to communicate with device 106. It should be further noted that routers or devices 104-106 may also be able to convert optical signals to electrical signals and vice versa.

Down stream hosts 109 further include multiple network capable devices 110-120 for distribution of packets between destinations and sources. Devices 110-120 are coupled to router 104 via connections 140-149. It should be noted that each host has a unique IP address whereby data packets can be routed accurately. For example, the IP address for device 110 is 199.188.0.6, while the IP address for device 112 is 199.188.0.8. Devices 110-120 can be any types of network capable devices, such as servers, modems, gateways, computers, switches, routers, printers, fax machines, and the like.

Each router or packet processing device 104 or 106, in one embodiment, includes multiple port cards, wherein each port card further includes ingress circuits and egress circuits. Each ingress circuit includes one or more input ports while each egress circuit includes one or more output ports. It should be noted that packets can travel from one source address to one or more destination addresses via one or more communication networks. The communication networks include optical communication networks, electrical communication networks, wireless communication networks, and the like. A portion of each packet such as the head portion of a packet indicates the source address(es), destination address(es), data type, and the like. For example, after extracting and reading the header of a packet, the router forwards or redirects received packet(s) to one or more of its output ports based on the information in the header. The header may be organized into multiple fields, such as fields for destination address, source address, packet type, quality of services ("QoS"), number of hops, length of payload, time stamp, and the like.

In operation, upon reading the header of a packet, the router determines whether to forward the packet or drop the packet based on the content of the header. For example, the packet may be dropped if its parameter(s) matches with previously identified spam parameter(s). If the packet is allowed to go forward, the router subsequently determines which output port(s) should be used to forward the packet. Router 104 may be required to convert data from one data format to another data format. For example, router 104 may receive optical signals from network 102 and subsequently, forward electrical signals to one or more destinations over copper cables 132 after converting optical signals to electrical signals. When the changes of a transmission media at the receiving end differs from the transmission media at the outputting end, each received packet not only needs to change its data format, but also changes its structure. For example, since optical transmission media has different noise tolerance and data capacity from the electrical transmission media, each packet is required to be rearranged and/or chopped before they can be forwarded.

System performance measurement unit 108 is a hardware tool for measuring latency and jitter through the system. Latency or system latency is a time delay from a packet entering a router to the packet leaving the router. In one embodiment, unit 108 is capable of real-time monitoring the latency and jitter through the system. The recorded or detected data relating to the latency and jitter are stored in a memory.

It should be noted that having an accurate measurement of jitter and latency is an important step of designing a network or network service. Various network components such as routers, system clock, wire delays, packet structure, and the like can introduce system jitter and latency. To enable real-time monitoring of system latency and jitter, a shared global timer in a parser engine array is used. The shared global timer is a free running counter running off a stratum clock and accessible to every processing element in the parser engine. The counters in every line module are kept in synchronization.

Figure 2:
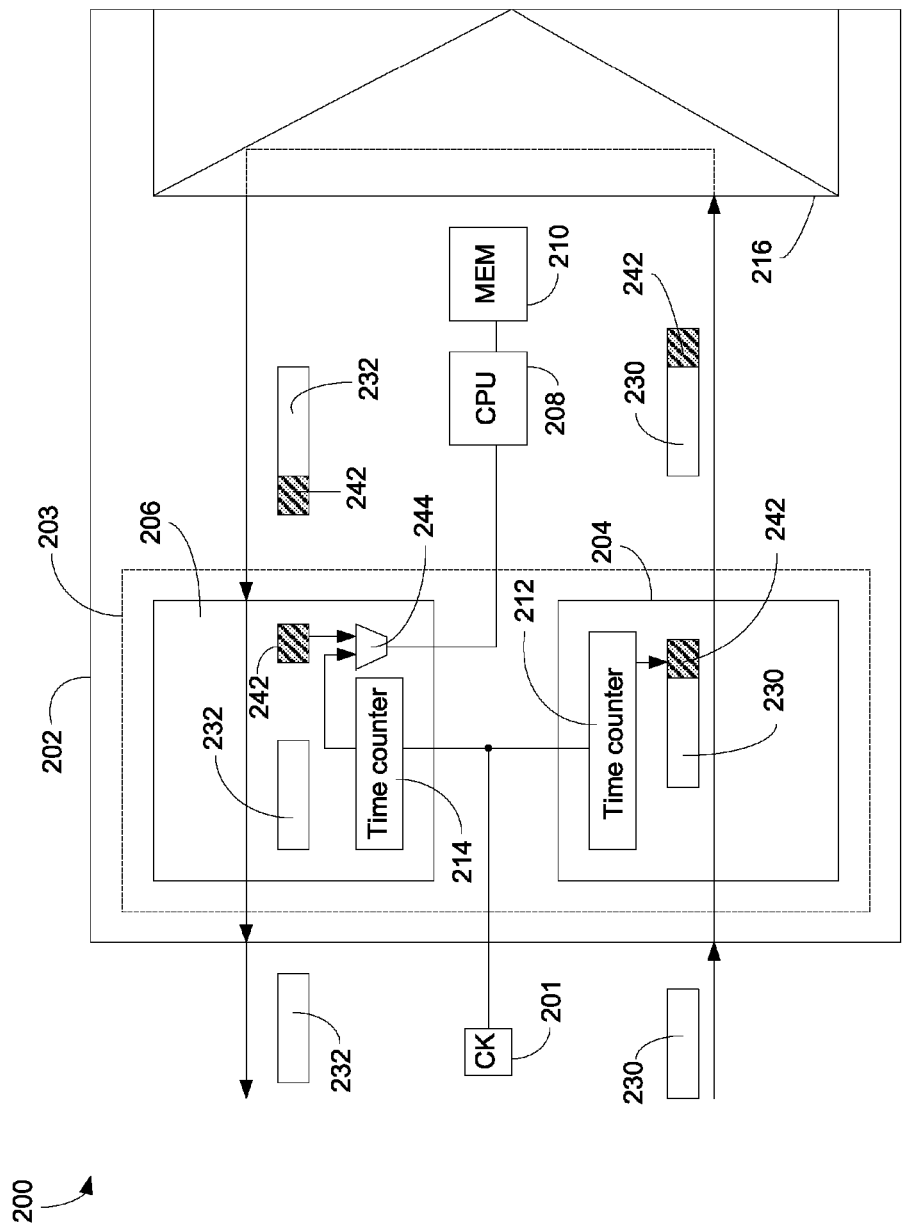
FIG. 2 is a block diagram illustrating a router having a performance measurement unit using time stamps in accordance with one embodiment of the present invention.

FIG. 2 is a block diagram 200 illustrating a router 202 having a performance measurement unit 203 using time stamps in accordance with one embodiment of the present invention. Router 202 includes a performance measurement unit 203, a stratum clock 201, a central processing unit ("CPU") 208, a memory 210, and a routing component 216. Routing component 216 includes circuitry for packet processing, such as packet classification, packet editing, packet shaping, and the like. It should be noted that the underlying concept of the embodiment(s) of the present invention would not change if one or more blocks (circuit or circuitries) were added to or removed from diagram 200.

Performance measurement unit 203 includes an ingress circuit 204 and an egress circuit 206. Ingress circuit 204 further includes an input unit and a global time counter 212. The input unit is capable of receiving a packet 230 via its input port(s) and identifying a head portion of packet and a payload portion of packet. The head portion, also known as header, indicates how to handle the payload, which is the data portion of the packet. It should be noted that ingress circuit 204 may contain multiple input units whereby it can receive simultaneously or substantially simultaneous multiple packets. 212 are common between all input units.

Global time counter 212 is a free running hardware counter activated in accordance with stratum clock. A function of the time counter 212 is to provide a shared global timer for a packet that just arrived, whereby an accurate measurement of latency or jitter can be derived for the packet. A stratum level of clock tree, in one embodiment, is used for all of the timing counters used in router 202. The clock cycles or signals generated by the same stratum level of clock tree are the same or substantially the same clock signals. Arrival time counter 212, in one embodiment, generates a time stamp or an arrival time stamp 242 when the input unit receives a packet 230, and subsequently, time stamp 242 is inserted into the packet. For example, arrival time stamp 242 may be inserted into the head portion of packet 230.

Egress circuit 206 includes an output unit and a departure time counter 214. Egress circuit 206 can be on same port card as Ingress circuit 204 or it can be on different port card. The output unit is capable of forwarding a packet 232 (It is same as packet 230 before processing) to other network device(s) via its output port(s). For example, when packet 232 together with its arrival time stamp 242 reaches egress circuit 206 after packet 232 had been processed by routing component 216, egress circuit 206 is the last stop before packet 232 is being shipped or forwarded to its destination. It should be noted that arrival time stamp 242 is extracted from packet 232 before it is forwarded. Upon accepting packet 232 from routing component 216, egress circuit 206 extracts arrival time stamp and outputs packet 232 via its output port(s).

Departure time counter 214, similar to arrival time counter 212 described earlier, is a free running hardware counter activated in accordance with stratum clock. A function of the time counters 212-214 is to provide and record time stamps for packets, whereby an accurate measurement of latency or jitter can be derived from the recorded time stamps. To provide accurate reference clock, same or substantially the same level of stratum reference clock should be used for all of the timing related counters in router 202. It should be noted that a system clock or crystal may be placed on the same board or substrate or chip for reducing clock skews. Departure time counter 214, in one embodiment, generates a departure time stamp when packet 232 reaches egress circuit 206. Alternatively, departure time counter 214 generates a departure time stamp at the time packet 232 leaves router 202. The departure time stamp and arrival time stamp 242 are used to calculate the latency of packet 232.

Departure time counter 214, in one embodiment, includes a comparing unit 244, which is used to calculate system latency in accordance with the departure time stamp and arrival time stamp 242. For example, comparing unit 244 subtracts the value of arrival time stamp from the value of the departure time stamp to derive packet latency. It should be noted that comparing unit 244 or the function of comparing unit 244 may be implemented in CPU 208. After calculation, system latency and/or jitter are forwarded to CPU 208 and they may be subsequently stored in a set of registers or memory such as memory 210.

Ingress circuit 204 and egress circuit 206, in one embodiment, is fabricated on the same port card or on different port card in a router. Each port card contains an ingress and egress circuit. A packet can be received via an ingress circuit on one port card and may leave via egress circuit of another/same port card. It should be noted that each port card may includes multiple ingress circuits and egress circuits, and each router may include multiple port cards. It should be further noted that performance measuring unit 203 may be on the same or different port cards.

During an operation, when ingress circuit 204 receives a packet 230 via its input port, circuit 204 obtains an arrival time stamp 242 from global time counter 212. After arrival time stamp 242 is inserted in the header of packet 230, packet 230 travels to routing component 216, which may includes multiple components for packet processing such as packet classification and modification. After packet processing, packet 232, which is packet 230 after packet processing, together with arrival time stamp 242 reaches egress circuit 206. Upon extracting arrival time stamp 242 from packet 232, Egress circuit 206 outputs packet 232 via its output port(s) and obtain a departure time stamp from global time counter 214. System or packet latency is calculated in accordance with arrival time stamp and departure time stamp. From system latency, system jitter can be computed. The computation can be carried out at comparing unit 244 or CPU 208. The result of the latency and jitter may be stored at memory 210 for later reference. It should be noted that reading arrival time counter when a packet arrives and reading departure time counter when a packet leaves provide a real-time monitoring and recording of system latency and jitter.

Every packet entering (or exiting) a system or a router is to be processed by the parser engine. Packets can be time-stamped with the global counter value at ingress. The counter value is subsequently extracted and analyzed at egress. The difference between the current value of the global counter and the value extracted from the packet is an indication of the latency experienced by the packet within the system. Jitter within a 'flow' can be computed by real-time monitoring of each packet's latency through the system. Flow indicates a packet traveling from the entering point to exiting point of a system.

As illustrated in FIG. 2, packet 230 enters router (or system) 202 and gets time stamped. The same or substantially same timer is used to find latency once packet reaches the egress side. The latency can be found in the following formula.

$$\text{Latency} = T_{departure\ time} - T_{arrival\ time}$$

It should be noted that global time stamp clock is common for all modules in the system. For example, if $T_{departure\ time}=2200$, $T_{arrival\ time}=2000$, and clock runs at 2.5 nanoseconds per cycle, the latency is (2200−2000)×2.5 nanosecond=0.500 microseconds. It should be noted that the mechanism of real-time monitoring collects latency information in the field.

Figure 3:
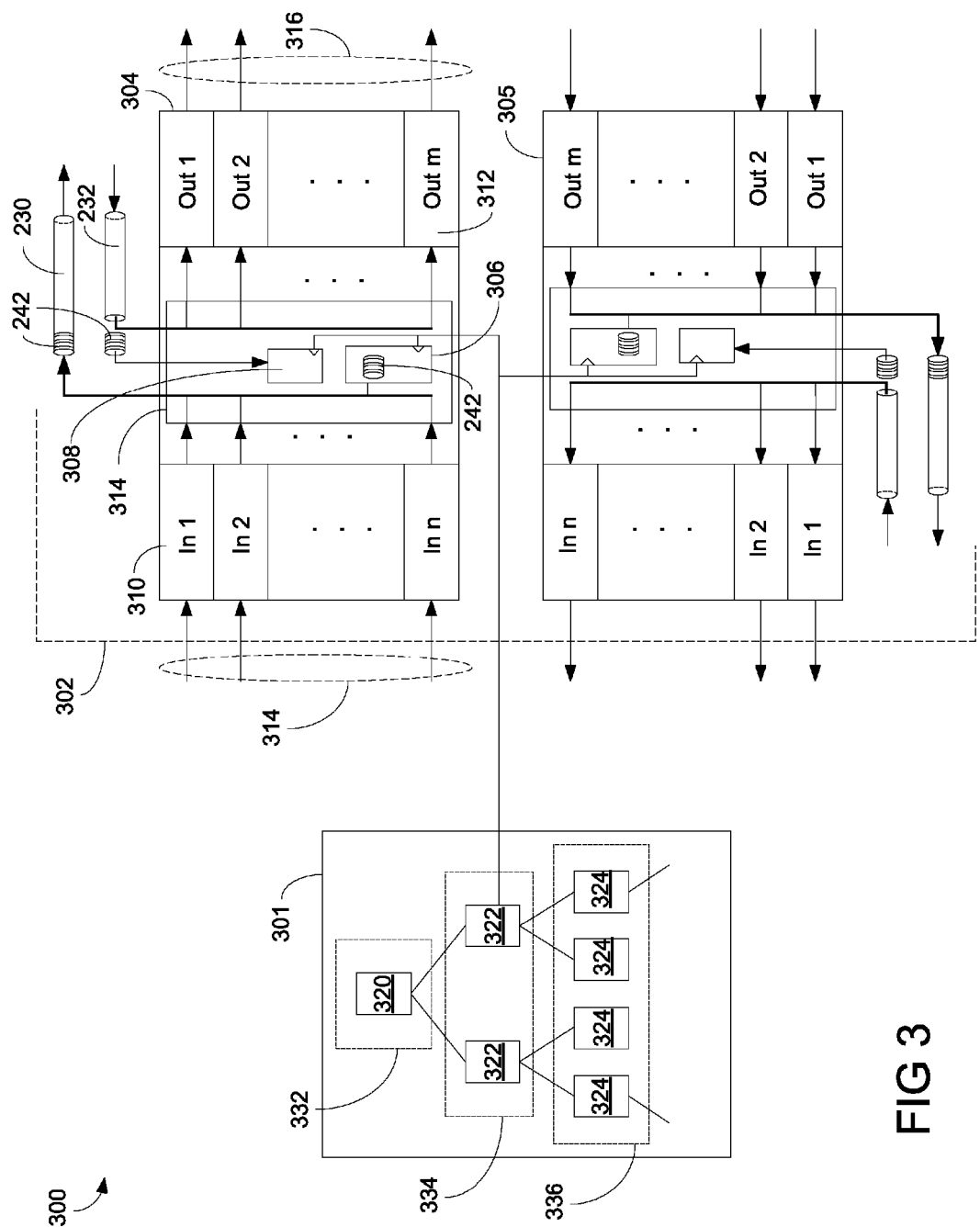
FIG. 3 is a block diagram illustrating a global clock circuitry capable of providing global time stamps in accordance with one embodiment of the present invention.

FIG. 3 is a block diagram 300 illustrating a global clock circuitry capable of providing global time stamps in accordance with one embodiment of the present invention. Diagram 300 includes a global clock circuitry 301 and a router 302, wherein router 302 also includes one or more port cards. It should be noted that global clock circuitry 301 performs similar functions as stratum clock 201 as shown in FIG. 2 and router 302 can be a network packet switch performing similar functions as router 202 illustrated in FIG. 2. It should be further noted that the underlying concept of the embodiment(s) of the present invention would not change if one or more blocks (circuit or circuitries) were added to or removed from diagram 300.

Clock circuitry 301 illustrates a stratum clock tree having three (3) stratum levels with level zero (0) as a reference clock. Clock signals generated by clock circuitry 301, for example, are synchronized using Network Time Protocol ("NTP") or Simple Network Time Protocol ("SNTP") for switching applications. The stratum clock tree is a hierarchical system of "clock strata" having stratum levels 332-336. Stratum levels 332-336 indicate distances between a reference stratum level 332 having a reference clock 320 and other stratum levels 334-336. The clock skew is generally small between clock signals generated by clock circuits situated in the same stratum level. The distance between a stratum level and the reference level determines the clock skew between clock signals generated by the stratum level and a reference clock signal. It should be noted that longer distance between a stratum level and reference level would result larger clock skew between clock signals generated by the stratum level and clock signals generated by the reference clock.

Clock circuitry 301 includes a zero (0) stratum level 332, a first (1) stratum level 334, and a second (2) stratum level. It should be noted that clock circuitry 301 can have more stratum levels. Zero stratum level 332 includes a reference clock 320 capable of generating reference clock signals. First stratum level 334 includes clock circuits 322 generating first stratum clock signals, while second stratum level 336 includes clock circuits 324 generating second stratum clock signals. As described earlier, clock signals generated in the same stratum level should have substantially the same clock skews. Clock skews, however, are different between reference clock signals and clock signals generated by stratum levels. For example, clock signals generated by stratum level 336 are less accurate than clock signals generated by stratum level 334 because stratum level 334 is closer to reference stratum level 332. If a stratum level situated physically closer to reference stratum level 332, it should provide more accurate clock signals in view of reference clock signals. Since measuring the latency and/or jitter requires accurate global time stamps, first stratum level 334 or the same stratum level should be used for providing accurate global time stamps.

Referring back to FIG. 3, router 302 includes two port cards 304-305, wherein port cards 304-305 are similar or substantially similar. It should be noted that router 302 may include one port card or more than two port cards. Port card 304 or 305, in one embodiment, includes ingress circuit 310, egress circuit 312, and a global time counter 314. Ingress circuit 310 includes multiple input ports In 1 to In n while egress circuit 312 includes multiple output ports Out 1 to Out m. Input ports are capable of receiving packets from one or more network channels 314, and output ports are configured to output packets to one or more network devices via multiple output channels 316. It should be noted that ingress circuit 310 and egress circuit 312 may be located in different port cards. It should be further noted that port card 304 may include other logic components but they are not necessary to understand the present embodiment of the invention.

Time counter 314, in one embodiment, includes a latency comparator 308 and a global time stamp generator 306, wherein latency comparator 308 and global time stamp generator 306 are connected to clock circuit 322 at first stratum level 334. It should be noted that first stratum level 334 provides accurate clock signals. When global time stamp generator 306 detects a packet 230, it generates a global time stamp or an arrival time stamp 242 in response to the counter value. The counter value, in one embodiment, is generated or updated by real-time clock signals from clock circuit 322. After global time stamp 242 is generated, it is attached to packet 230 and packet 230 is subsequently forwarded for packet processing.

When a packet 232 is ready to exit router 302, latency comparator 308 retrieves global time stamp or arrival time stamp 242 from packet 232, which is the processed packet 230, and calculates the latency in response to the current counter value. It should be noted that counter value is maintained and updated in response to real-time clock signals generated by a stratum clock such as clock circuit 322 at first stratum level 334. It should be noted that the counter value can be used for arrival time stamp as well as departure time stamp for a particular packet. The calculated latency may be stored in router 302 or other network devices. It should be noted that a packet can enter and exit router 302 via the same port card 304. Alternatively, a packet enters router 302 via port card 304 and leaves router 302 via port card 305.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein are equally applicable to other network infrastructures or other data communication environments.

Figure 4:
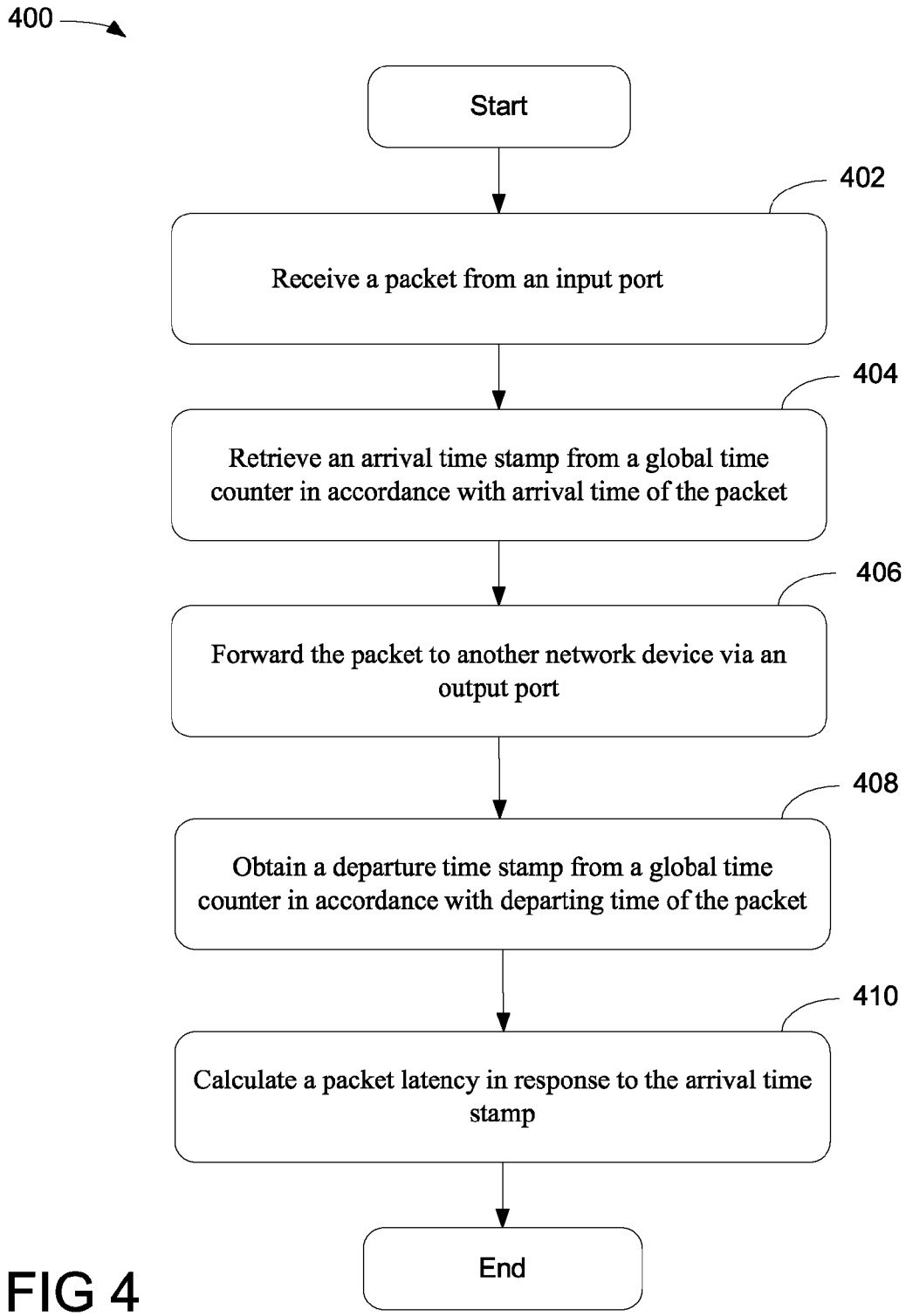
FIG. 4 is a flowchart illustrating a process of measuring system performance using time stamps in accordance with one embodiment of the present invention.

FIG. 4 is a flowchart illustrating a process 400 of measuring system performance using time stamps in accordance with one embodiment of the present invention. At block 402, the process receives a packet from an input port. Input port may be controlled by the ingress circuit. After block 402, the process proceeds to the next block.

At block 404, the process retrieves an arrival time stamp from a global time counter in accordance with the arrival time (present value of global time counter) of the packet. The global time counter is a shared global timer driving by a stratum clock tree. In one embodiment, the arrival time is inserted in the packet before it continues to travel to the next component. For example, a packet header has a dedicated field for storing the arrival time stamp. After block 404, the process proceeds to the next block.

At block 406, the process forwards the packet to another network device via an output port. In one embodiment, the egress circuit extracts the arrival time stamp from the packet before it is forwarded. After block 406, the process moves to the next block.

At block 408, the process obtains a departure time stamp from a global time counter in accordance with the departing time of the packet. In one embodiment, egress circuit extracts the arrival time stamp before transmitting the packet to another network device. After block 408, the process proceeds to the next block.

At block 410, the process calculates packet latency in response to the arrival time stamp. For example, the egress circuit subtracts the arrival time stamp from the departure time stamp. Upon obtaining the latency, a measurement of system jitter can be obtained. The arrival time counter and the departure time counter are activated by the same or substantially the same clock signals. Latency and jitter may be stored in memory for later reference. After block 410, the process ends.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network device, comprising:
   a global time counter coupled to an ingress circuit of the network device and configured to generate an arrival time stamp in accordance with arrival time of a packet;
   an egress circuit coupled to the ingress circuit and capable of forwarding the packet to other network devices via an output port, wherein the egress circuit obtains a departure time stamp from the global time counter in accordance with departing time of the packet;
   a clock circuitry arranged in a hierarchical stratum clock tree having at least a first (1) stratum level of reference clock signals and a second (2) stratum level of reference clock signals, wherein the first (1) stratum level is logically higher level than the second (2) stratum level, wherein the global time counter is updated by a reference clock in accordance with the first (1) stratum level of the reference clock signals; and
   a processor coupled to the egress circuit and configured to calculate a packet latency of the network device in response to the arrival time stamp and the departure time stamp.

2. The device of claim 1, wherein the global time counter includes an arrival time counter and a departing time counter wherein the departing time counter is capable of generating a departure time stamp in accordance with departing time of the packet.

3. The device of claim 2, wherein the processor is capable of obtaining the packet latency by subtracting the arrival time stamp from the departure time stamp.

4. The device of claim 3, further comprising a global clock tree, coupled to the processor, providing substantially same clock cycles to the arrival time counter and the departing time counter.

5. The device of claim 1, wherein the ingress circuit is a receiver and the egress circuit is a transmitter, wherein the ingress circuit and the egress circuit are situated in the network device.

6. The device of claim 2, wherein the packet is a data stream formatted in a data block having a header portion and a payload portion.

7. The device of claim 2, wherein the processor is capable of obtaining measurement of system jitter in response to the packet latency.

8. A network router capable of receiving and transmitting data packets comprising the device of claim 2.

9. A method of network service, comprising:
   generating a first (1) stratum level of clock signal in accordance with a clock circuitry arranged in a hierarchical stratum clock tree having at least the first (1) stratum level of clock signals and a second (2) stratum level of clock signals,
   updating a global time counter of a network device in response to the first (1) stratum level of the clock signals;
   retrieving an arrival time stamp from the global time counter of a network device in accordance with arrival time of a packet;
   forwarding the packet to another network device via an output port;
   obtaining a departure time stamp from the global time counter in accordance with departing time of the packet; and
   calculating packet latency of the network device in response to the arrival time stamp and the departure time stamp.

10. The method of claim 9, further comprising inserting the arrival time stamp into the packet before the packet travels to next component.

11. The method of claim 10, wherein forwarding the packet to other devices further includes extracting the arrival time stamp by an egress circuit.

12. The method of claim 11, wherein obtaining the packet with the arrival time stamp by an egress circuit further includes extracting the arrival time stamp from the packet before transmitting the packet via the output port.

13. The method of claim 9, wherein calculating packet latency in response to the arrival time stamp further includes subtracting the arrival time stamp from the departure time stamp.

14. The method of claim 9, further comprising obtaining a measurement of system jitter in response to the packet latency.

15. The method of claim 9, further comprising providing substantially same clock signals to the arrival time counter and the departure time counter.

16. A system comprising:
   a clock circuitry configured with a stratum clock tree having a first (1) and second (2) stratum levels wherein each stratum level is capable of generating clock signals;
   a network device coupled to the clock circuitry and including one or more port cards that include an ingress circuitry, egress circuitry, latency comparator, and global time counter;
   wherein the ingress circuitry receives a packet from one or more network devices through one or more network channels and generates a packet arrival time stamp in accordance with the global time stamp generator;
   the egress circuitry sends packets to one or more network devices through one or more network channels and generates a departure arrival time stamp in accordance with the global time stamp generator for the packet sent;

wherein the global time counter, coupled to a global time stamp generator, is updated in response to the first (1) stratum level of clock signals
wherein the latency comparator generates a packet latency indicating system jitter.

17. The system of claim 16, wherein the latency comparator is capable of obtaining the packet latency by subtracting the arrival time stamp from the departure time stamp.

18. The system of claim 17, wherein the latency comparator is capable of obtaining measurement of system jitter in response to the packet latency.

19. The system of claim 16, wherein the latency comparator is capable of extracting the arrival time stamp from the packet and subtracting the arrival time stamp from the departure time stamp to obtain the packet latency.

20. The system of claim 16, wherein the first (1) stratum level is logically situated at a higher level than the second (2) stratum level.

* * * * *